UNITED STATES PATENT OFFICE.

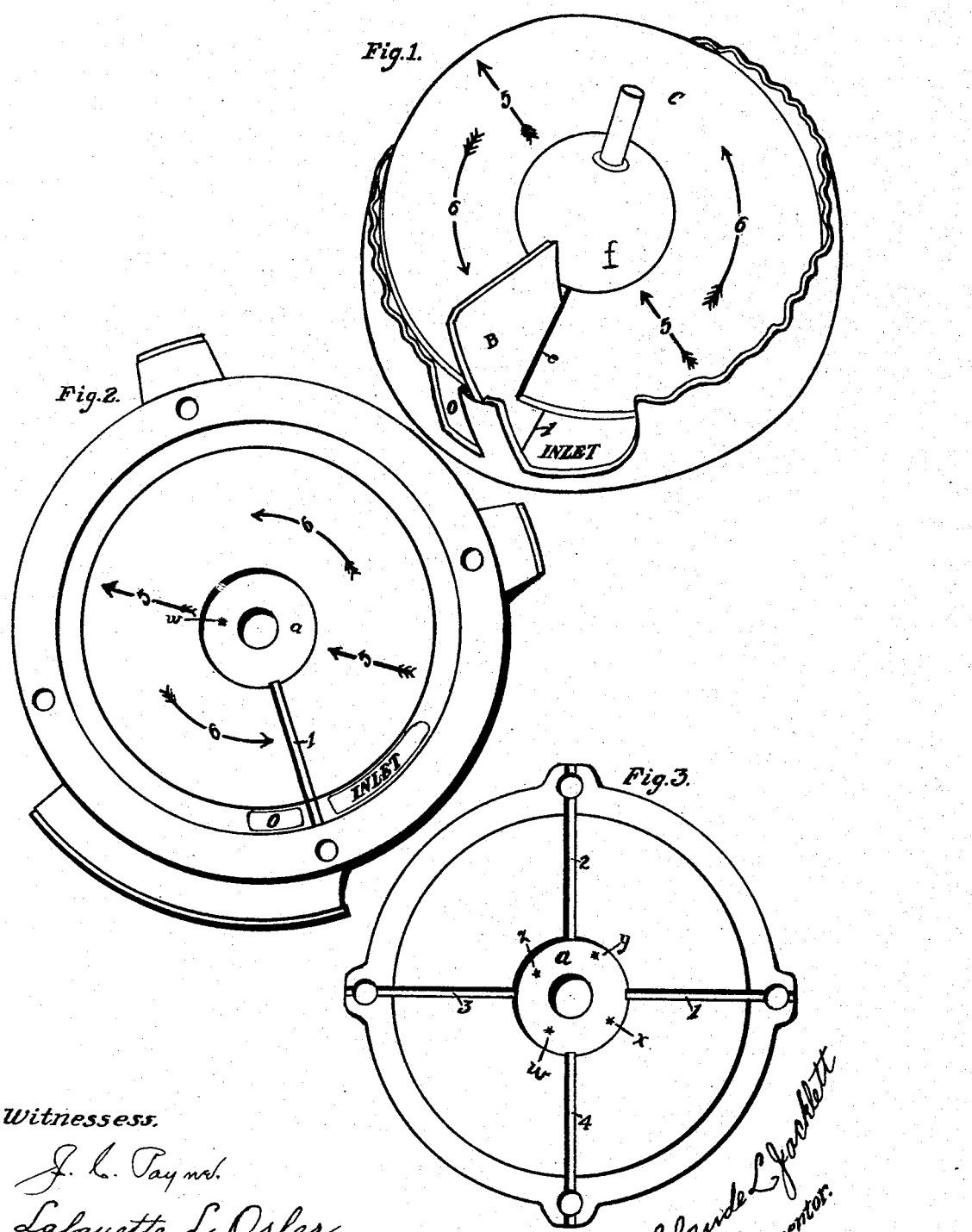

CLAUDE L. JACKLETT, OF NORTH YAKIMA, WASHINGTON.

MEASURING-CHAMBER OF FLUID-METERS OF THE DISK TYPE.

1,186,479.      Specification of Letters Patent.      Patented June 6, 1916.

Application filed July 12, 1915. Serial No. 39,285.

*To all whom it may concern:*

Be it known that I, CLAUDE L. JACKLETT, a citizen of the United States, residing at North Yakima, in the county of Yakima and the State of Washington, have invented a new and useful Improvement in the Measuring-Chambers of Fluid-Meters of the Disk Type, of which the following is a specification.

My invention relates to the measuring chamber of fluid meters of the disk type and it has for its object to provide an improved construction whereby those parts of the measuring chamber containing the socket bearings may be rotated when worn and thus extend the period of use of those parts from two to six times as long as at present.

With these ends in view I devised the means shown in the accompanying drawing, in which:—

Figure 1, is a detailed view in perspective of a measuring chamber having the top half cut away exposing the nutating disk and the diaphragm, Fig. 2, is top view of a measuring chamber with the top cone plate and the disk removed, Fig. 3, is a detailed top view of a bottom cone plate with the additional diaphragm slots provided for by my invention cut therein.

In use, the tendency of the flowing water on entering the measuring chamber at the inlet port is to carry the disk "C" around with it in the direction of the outlet port "O", to cause it to move with the current like a chip floating on a stream. Arrows "6—6" indicate direction of flow. When a meter of this type is new, this circular thrust "6—6" is resisted by the edge of the disk opposite the edge "$e$" which slides up and down against the diaphragm "B" on the outlet port side. This holds the ball "$f$" of the disk "C" directly in the center of the bearing "$a$" and causes little wear on either the ball or the bearing sockets. The bearing surface presented by the edge of the disk opposite the edge "$e$" soon yields under rapid motion and heavy pressure producing a new condition and an increased friction. Wear of the ball and sockets follows and the disk is without axial control involving a side thrust, in direction of arrows "5—5". The strains are thus greatly increased as the resistance increases and this involves an increase of water pressure to continue the operation with the result that the sensibility of the meter becomes greatly decreased by the increased friction and finally the meter is rendered inoperative by the smashing of the disk.

In the present state of the art it is customary to repair the meter by removing the cone plates containing the worn socket bearing "$a$" and discarding them as having no further use. By the employment of my invention in the manufacture of meters, the meters leave the factory with two or more sets of diaphragm slots in the measuring chamber "1, 3" or "1, 2, 3, and 4," etc., and when the meter becomes inoperative through wear, a new ball is provided for the disk, and the cone plates are rotated to bring the diaphragm into another set of slots. With meters that have cone plates having only one diaphragm slot, I employ my invention by milling the necessary or desired number of slots therein and replace the cone plates with the diaphragm engaged in one of the new slots.

By experience, I have found that the point of wear "$w$" is located about 120 degrees from the outlet port and that by rotating that part of the measuring chamber containing the socket bearing and diaphragm slots and by keeping the diaphragm and the inlet and outlet ports stationary, I could provide successively new and unworn points of wear "$w$", "$x$", "$y$", "$z$" as each diaphragm slot was in turn engaged by the diaphragm.

As the lower cone socket receives harder wear than the upper one, it is within the scope of my invention that a lower cone plate containing a plurality of diaphragm slots may be used in connection with an upper cone plate having only one diaphragm slot, or that at times the lower cone plate may be rotated to an unused slot while the upper cone plate's position is unchanged.

While I have shown and described my invention as applied to a disk water meter of a particular make, I desire it to be understood that the invention may be utilized in connection with meters of other varieties and that the illustrations and descriptions of specific details of construction are not to be constructed as limiting the invention to such details.

I claim as my invention—

1. In the measuring chamber of a fluid-meter of the wabble-disk type, the combination with a disk-casing having a plurality of slots, and a disk, of a diaphragm changeable from one set of slots to any of the other sets of slots so as to provide the ball of the disk with a fresh, unworn bearing place in the socket of the disk chamber, substantially as specified.

2. The cone-plate of a measuring chamber of a fluid meter of the disk type having more than one diaphragm groove, the said grooves lying so that the rotation of the cone-plate the proper distance will allow the diaphragm to engage in the slot desired.

CLAUDE L. JACKLETT.

Witnesses:
LAFAYETTE L. OSLER,
J. C. PAYNE.